US007571081B2

(12) United States Patent
Faulkner et al.

(10) Patent No.: US 7,571,081 B2
(45) Date of Patent: Aug. 4, 2009

(54) SYSTEM AND METHOD FOR EFFICIENT VISUALIZATION AND COMPARISON OF LADAR POINT DATA TO DETAILED CAD MODELS OF TARGETS

(75) Inventors: Tim Faulkner, Palm Bay, FL (US); Steven G. Blask, Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 751 days.

(21) Appl. No.: 10/892,063

(22) Filed: Jul. 15, 2004

(65) Prior Publication Data

US 2006/0015301 A1 Jan. 19, 2006

(51) Int. Cl.
*G06F 17/10* (2006.01)
*G06G 7/48* (2006.01)
(52) U.S. Cl. .............................. 703/6; 703/2
(58) Field of Classification Search ................. 382/294, 382/284; 703/2, 6
See application file for complete search history.

(56) References Cited

U.S. PATENT DOCUMENTS

| 5,644,386 | A | * | 7/1997 | Jenkins et al. ............. 356/4.01 |
| 5,684,935 | A | * | 11/1997 | Demesa et al. ............. 345/419 |
| 5,796,471 | A | | 8/1998 | Wilkerson |
| 5,892,575 | A | * | 4/1999 | Marino ...................... 356/5.01 |
| 5,898,793 | A | * | 4/1999 | Karron et al. ............... 382/131 |
| 6,040,835 | A | * | 3/2000 | Gibson ....................... 345/424 |
| 6,131,097 | A | * | 10/2000 | Peurach et al. ............. 707/102 |
| 6,512,993 | B2 | | 1/2003 | Kacyra |
| 6,597,818 | B2 | * | 7/2003 | Kumar et al. ............... 382/294 |
| 6,606,091 | B2 | | 8/2003 | Liang |
| 6,619,406 | B1 | | 9/2003 | Kacyra |
| 7,203,634 | B2 | * | 4/2007 | Jayaram et al. ............. 703/22 |
| 2002/0158880 | A1 | * | 10/2002 | Williams et al. ............ 345/582 |
| 2003/0052169 | A1 | | 3/2003 | Tsikos |
| 2003/0053513 | A1 | | 3/2003 | Vatan |

OTHER PUBLICATIONS

M Albota, B Aull, D Fouche, R Heinrichs, D Kocher, R Marino, J Mooney, N Newbury, M O'Brien, B Player, B Willard, J Zayhowski, Three-Deminsional Imaging Laser Radars with Geiger-Mode Avalanche Photodiode Arrays, Nov. 2, 2002, vol. 13, Lincoln Laboratory Journal.*

(Continued)

*Primary Examiner*—Hugh Jones
(74) *Attorney, Agent, or Firm*—Allen, Dyer, Doppelt, Milbrath & Gilchrist, P.A.

(57) ABSTRACT

A method compares point data to detailed CAD models of known targets. The method includes the acts of receiving a CAD model space, storing the received CAD model space in a three-dimensional voxel array, computing, for each voxel in the array, a distance to a closest surface facet, and storing information in a hybrid PolyVox file having both voxel and polygonal representations of the point data stored therein. The method uses an information processing system such as a microprocessor powered computer. The method can also use a software product executed by a programmable general purpose computer, a set of machine executable instructions embedded in a semiconductor memory, or a special-purpose processing device or application-specific integrated circuit.

15 Claims, 8 Drawing Sheets

OTHER PUBLICATIONS

Bradley W. Schilling, Dallas N. Barr, Glen C. Templeton, Lawrence J. Mizerka, C. Ward Trussell, Multiple-return laser radar for three-dimensional imaging through obscurations, May 20, 2002, vol. 41, No. 15, Optical Society of America.*

Steve Hsu, Supun Samarasekera, Rakesh Kumar, Automatic registration and visualization of occluded targets using ladar data, Apr. 2003, vol. 5086, Proc. SPIE Laser Radar Technology and Applications VIII.*

Martin Kraus and Thomas Ertl, "Topology-Guided Downsampling" Visualization and Interactive Systems Group, Universitat Stuttgart, Germany, 2001, pp. 1-9, Considered on Jun. 16, 2009.

* cited by examiner

SYSTEM AND METHOD FOR EFFICIENT VISUALIZATION AND COMPARISON OF LADAR POINT DATA TO DETAILED CAD MODELS OF TARGETS

STATEMENT REGARDING FEDERALLY SPONSORED RESEARCH OR DEVELOPMENT

The invention claimed was conceived or first constructed under Government Contract No: DAAD17-01-D-0004 awarded by the Defense Advanced Research Projects Agency (DARPA). The Government has certain rights in this invention.

CROSS-REFERENCE TO RELATED APPLICATIONS

This application relates to technology similar to that discussed in concurrently filed U.S. patent applications Ser. No. 10/892,047 entitled "METHOD AND SYSTEM FOR SIMULTANEOUSLY REGISTERING MULTI-DIMENSIONAL TOPOGRAPHICAL POINTS," Ser. No. 10/891,950 entitled "BARE EARTH DIGITAL ELEVATION MODEL EXTRACTION FOR THREE-DIMENSIONAL REGISTRATION FROM TOPOGRAPHICAL POINTS," and Ser. No. 10/892,055 entitled "SYSTEM AND METHOD FOR IMPROVING SIGNAL TO NOISE RATIO IN 3-D POINT DATA SCENES UNDER HEAVY OBSCURATION," all of which are assigned to the same assignee as the present application and are incorporated by reference herein in their entirety.

FIELD OF THE INVENTION

The invention disclosed broadly relates to the field of image processing and more particularly relates to the field of processing point data obtained from a 3-D imaging Laser RADAR (LADAR) sensor viewing an obscured object.

BACKGROUND OF THE INVENTION

Systems for processing digital representations of images are commonly used to process data representing surfaces such as digital elevation models (DEMs). A DEM is a digital map of the elevation of an area on the earth. The data is collected by any well-known means such as LADAR (Laser Detection And Ranging), or by IFSAR (Interferometric Synthetic Aperture Radar) or the like. In operation, the LADAR instrument transmits light to a target. The transmitted light interacts with and is changed by the target. Some of this light is reflected or scattered back to the sensor of the transmitting instrument where it is detected, stored, and analyzed. The change in the properties of the light enables some properties of the target to be determined. The time required for light to travel to the target and back to the LADAR instrument is used to determine the range to the target. IFSAR is used to ingest and process high-resolution elevation data produced through a technique called radar interferometry.

As in the case of LADAR, IFSAR produces data useful for extracting DEMs.

Digital elevation models (DEMs) may be represented as a height map through gray scale images wherein the pixel values are actually terrain elevation values. The pixels are also correlated to world space (longitude and latitude), and each pixel represents some variable volume of that space depending on the purpose of the model and land area depicted.

Referring to FIG. 1 there is shown an example of an airborne LADAR system 100. The system comprises a LADAR instrument 102 mounted on an aircraft 104. Below the aircraft is an area 107 comprising the ground and a canopy formed by trees and other foliage obstructing the view of the ground (earth) from an aerial view. The LADAR instrument 102 emits a plurality of laser light pulses which are directed toward the ground. The LADAR instrument 102 comprises a sensor 103 that detects the reflections/scattering of the pulses. The LADAR instrument 102 provides 3-D data including elevation (Z) versus position (X,Y) information from a single frame. It should be noted, however, that multiple frames of portions of the area from different perspectives are used to generate a composite image. The tree canopy overlying the terrain results in significant obscuration of targets (e.g. vehicle 106) under that tree canopy. The points received by the sensor 103 of instrument 102 from the ground and the target 106 are thus sparse. Hence, a robust system for processing the points is required. Moreover, to be of the most value, an image of the ground wherein the target 106 can be perceived easily must be available quickly.

Extraction of data points generated by LADAR to produce a DEM is known. However, such methods are computationally intensive, and where a large number of data points are processed, run-time applications can be difficult and/or slow. Therefore, there is a need for more efficient methods and systems for production of DEMs using topological data points. In order to be sensitive enough to detect and discern scene content under heavy obscuration (trees, camouflage netting, etc.), the sensor should be able to trigger on single photons.

Once point data such as that collected by a LADAR sensor is processed there still remains the task of identification of the objects in the scene. In the situation discussed above, the task may be to identify the type and model of a hidden vehicle. The output of the processing of the raw point data may still be a cloud of points that may not provide sufficient information for a human to identify. Moreover, there may be a huge amount of data required to provide an output that really takes the guesswork (intuition) out of identifying the target.

For manual identification of vehicles under heavy cover from LADAR point data, several significant challenges arise when exploiting the data within a visualization tool. Such a tool should (1) compare a high voxel resolution cloud of point data to a very detailed model (high polygonal facet count) to verify ID; (2) detect differences between the point data and the model (new features, add-on or relocated parts, etc.); (3) focus on data in the vicinity of the object to be identified and make the rest of the data disappear; and (4) strip away close obscurants (camouflage netting, low foliage, and the like). Therefore, there is a need for an improved solution to the object identification problem that satisfies the above requirements.

SUMMARY OF THE INVENTION

The above-discussed and other shortcomings of the prior art are addressed and overcome by the present invention which provides a system and method for efficient visualization and comparison of 3-D point data, such as provided by a LADAR sensor, to detailed CAD (computer-aided design) geometric models of objects.

DETAILED DESCRIPTION

Figure 1:
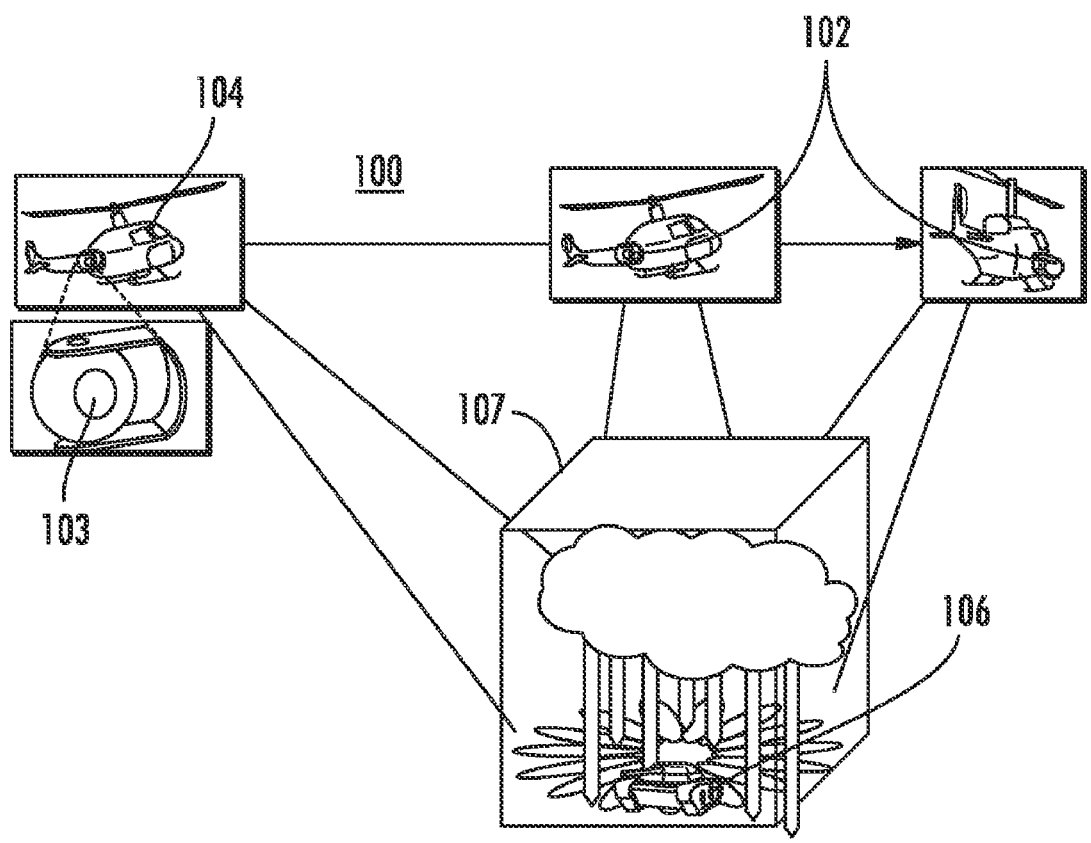
FIG. 1 is a depiction of an airborne LADAR instrument for processing images of a tree-covered terrain concealing a vehicle, according to the known art.
Figure 2:
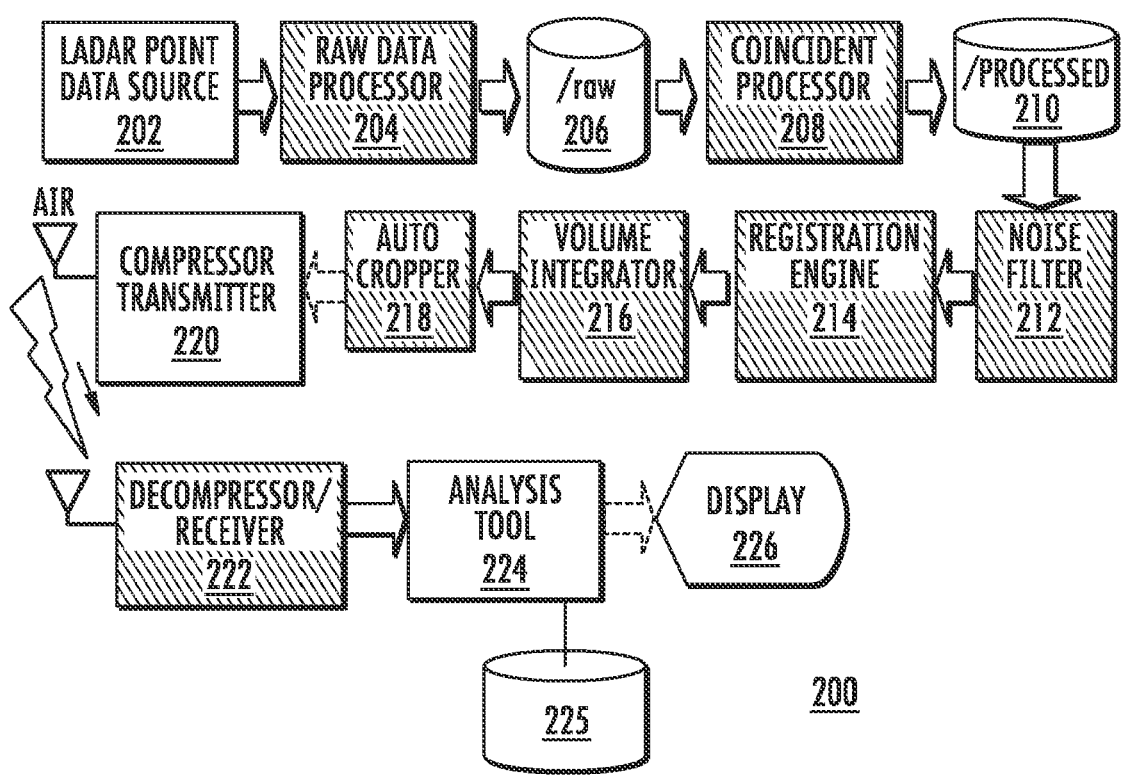
FIG. 2 is a high level block diagram showing an information processing system according to an embodiment of the invention.

Referring to FIG. 2, there is shown a high level block diagram 200 representing a system and method for processing LADAR point data using an embodiment of the invention. The system 200 comprises a source 202 of topographical data points. In this embodiment the source 202 is an aircraft such as a helicopter. The source 202 provides raw data comprising points that are preferably a plurality of three-dimensional (3D) topographical point values provided by a LADAR instrument 102 as discussed with respect to FIG. 1.

For purposes of this discussion we assume that a reconnaissance aircraft has spotted a potential target and a second aircraft equipped with LADAR is sent for a flyover of the target area. The second aircraft is the data source 202. The data is processed in the air by blocks 204, 208, 212, 214, 216 and 218 and is then compressed by block 220 and downloaded to a ground analysis center where the target is identified by an analysis tool 224 for display 226 for interactive processing with a user.

Referring again to FIG. 2, the data source 202 provides a plurality of subframes to a data processor 204. These subframes comprise timing measurements and metadata which may be computationally transformed into frames (or volumes) of 3D points representing a complex multidimensional object such as the terrain shown in FIG. 1. In this embodiment, the object comprises a base surface (e.g., the ground or earth), a vehicle such as a tank 106, and a plurality of obstructions (e.g., tree tops) above the surface that conceal most of the tank 106. Each frame comprises the measurements collected by the sensor 103 over a given period of time (an exposure) as the aircraft 104 moves over the terrain where the vehicle is located. In the preferred embodiment, this time period is one quarter of a second and, with current instruments, that exposure results in the collection of hundreds of thousands of topographical date points by the LADAR sensor 103.

System 200 improves on the performance of the prior art, at least in part, by using only data points representing the ground surface and a target 106 (if present) and not the obstructions at a height greater than a predetermined threshold above the ground. Using only the ground points greatly reduces the number of points that are to be down-linked and processed and thus reduces the time required to produce an accurate model of the terrain.

The data processor 204 receives a single field of view "subframe" from the data source 202 and logs it to a file preferably stored in storage space 206. The file comprises the raw telemetry data produced by the source 202 and also includes a plurality (e.g., thousands) of timing measurements for light pulses reflected by a target or targets on the ground.

Storage space 206 stores the received raw data into a file comprising a log of the received items of telemetry and timing measurement data. The file is stored so that the raw data can be re-processed later, if required.

A coincident processor 208 receives the raw telemetry and timing measurement data, computationally converts these measurements into 3D angle-angle-range points, and performs a transformation of the LADAR data from its angle-angle-range format for locations of the points to an x-y-z coordinate space for producing a plurality of 3D volume frames to be stored in a set of processed frame files.

Processor 208 also performs coincident processing. This processing comprises performing a count of measurements received from the data source 202 and using the x,y,z data for organizing and storing the received point data in a three-dimensional (3D) array of voxels. The voxel array represents a space large enough to contain the sought target (e.g., a volume that is 30 meters on each side). The volume represented by each voxel is selected according to the resolution of the LADAR instrument used.

Processor 208 produces processed data in the form of a plurality of frame files. As the LADAR sensor 103 in the aircraft 102 flies over the target 106, different gaps in the tree cover are exposed such that LADAR flashes are reflected from the target through the gaps. The sensor 103 takes a plurality of "snapshots" or frames of data (e.g., at intervals that are a fraction of a second). Thus, a sufficient amount of point data is collected to obtain an image of the partially hidden target 106. The output of the processor 208 is stored in a storage area 210 from where it is provided to the noise filter 212. In the preferred embodiment each frame file comprises a two kilobyte header with information such as the time that the data was collected (the timestamp) and the location where the date was collected, along with global positioning information.

The data provided by the LADAR instrument 102 may comprise an effect known as dark noise. Dark noise is caused by random scattering of sunlight into the receiver, or random thermal or other effects within the sensor's detector and integrated electronics, which cause false measurements to appear in the frame imagery. Step 212 filters the received point measurements to remove the dark noise. Different sensors have different dark count noise rates. Therefore, the filter 212 is not always required.

The filter 212 removes the dark noise by eliminating any false measurements received at the input of the filter 212. The filter 212 eliminates point data that is determined to be unreliable or unlikely to be a reflection of the target as will be discussed below. The filter 212 provides a filtered set of frames that includes the point data most likely to be the result of reflections of LADAR pulses from a physical object such as the target 106.

A registration engine 214 performs spatial alignment of the noise filtered frames via a process that may be similar to that discussed in the co-pending applications Ser. Nos. 10/892,047 and 10/891,950. Engine 214 produces a plurality of registered volumes of point measurements. The quality of the registration depends on a good signal-to-noise ratio because when false data points (noise) are used in the registration there is a high likelihood that there will be noise-to-noise point alignment resulting in a distorted registration image.

Next, a frame integrator (volume integrator) 216 performs a union of the registered volumes produced by the engine 214. In the course of combining the measurements of different frames for the same voxel, the mean 3D point return is computed and stored in the output frame. This union frame is provided to an auto cropper 218.

The auto cropper 218 automatically detects the ground plane by analyzing the Z histogram of the point data in the union frame, and crops the volume to produce a composite image suitable for presentation to a user. Auto cropper 218 filters out points higher than the maximum expected vehicle height above the ground, removing the obstructions such as those from the top of the trees. As expected, the number of LADAR pulses that reach the ground through the trees and other foliage is much smaller than those emitted by the LADAR source-(or emitter). Therefore, the points representing the ground (ground points) detected at the LADAR sensor 103 are commensurately fewer than the total number received from the totality of the terrain below the aircraft 104. In the embodiment discussed herein a target such as the tank 106 hidden under the treetops as shown in FIG. 1 would be depicted without the obscuring effect of the canopy of trees over the tank 106.

The remaining part of the task is identification of the target 106 possibly with human interaction. This is done at a ground analysis station comprising an analysis tool 224 and a user interface comprising a display 226.

To facilitate the ground analysis the processed point data provided by the cropper 218 is compressed by a compressor/transmitter 220 using a known data compression algorithm and conventional secure wireless transmission protocol. The compressed data is received at a decompressor/receiver 222 where it is decompressed, placed in storage 225, and provided to the analysis tool 224.

Figure 3A:
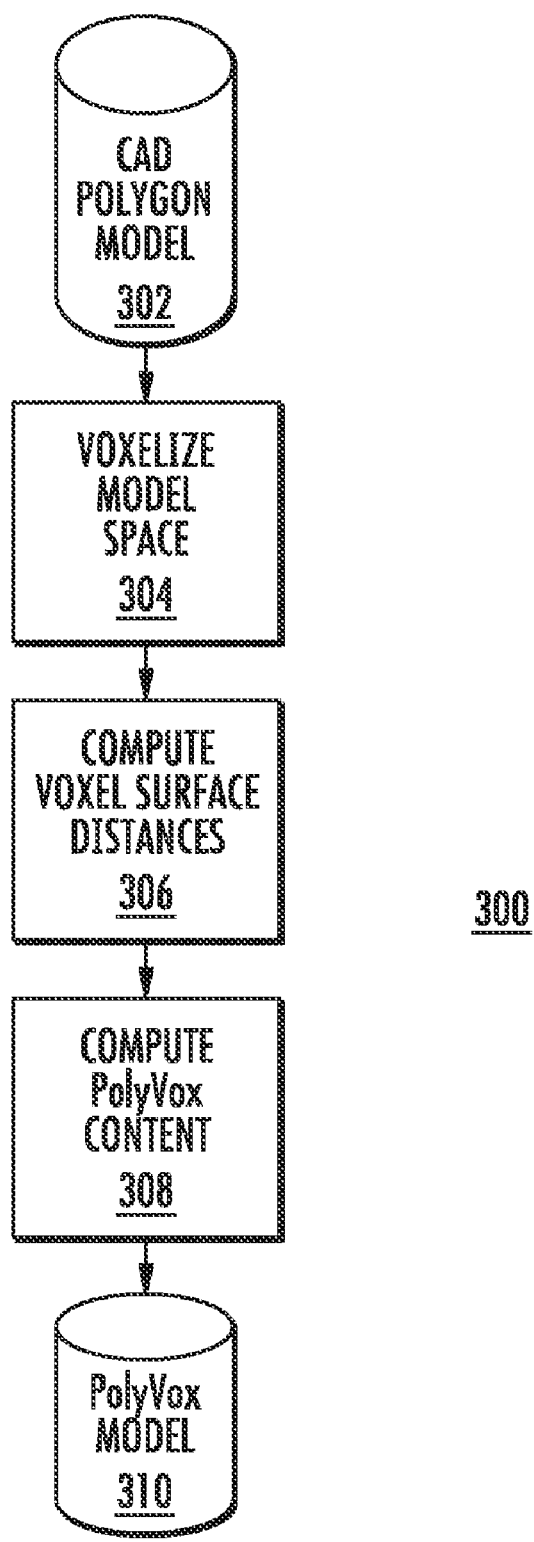
FIGS. 3A and 3B are flowcharts of an efficient visualization method for comparison of LADAR point data to detailed CAD models of objects according to an embodiment of the invention.

Referring to FIG. 3A, there is shown a flowchart of an off-line method 300 for computation of a PolyVox model file from detailed CAD models of objects according to an embodiment of the invention. This process is preferably performed using the analysis tool 224.

First a CAD polygon model 302 is received as an input to the method 300. CAD models are highly detailed models that incorporate geometric data about the object modeled. In this case we consider a CAD model of a typical vehicle such as a tank.

In step 304 the space surrounding the CAD model is partitioned into a voxel array. The dimensions of the array are selected based at least in part on the size of the CAD model and the resolution of the sensing instrument (e.g., the LADAR sensor 103) that provided the point data.

Next, step 306 computes the voxel to surface distances. For each voxel in the array the distance to its closest surface facet (e.g., a small planar polygonal patch comprising a portion of a feature surface, such as the side of the tank turret) is computed. For very detailed CAD models to sufficiently capture the detailed geometric shape of complex objects, tens of thousands of triangular polygonal facets may be used to describe the object (vehicle) modeled. It is therefore a very computationally-intensive task to compute the distance from each voxel to all of the polygonal facets in the model in order to discover the closest one. This can take hours even with powerful computers. Therefore, according to an aspect of the invention these calculations are done offline ahead of time (i.e., before LADAR data is collected).

Step 308 computes the PolyVox content. Thus, a hybrid PolyVox file 310 is created that stores, in storage area 225 (discussed with reference to FIG. 2), the information computed in step 306. The PolyVox file 310 is used to store information comprising both voxel and polygonal representations of the object being modeled.

Figure 3B:
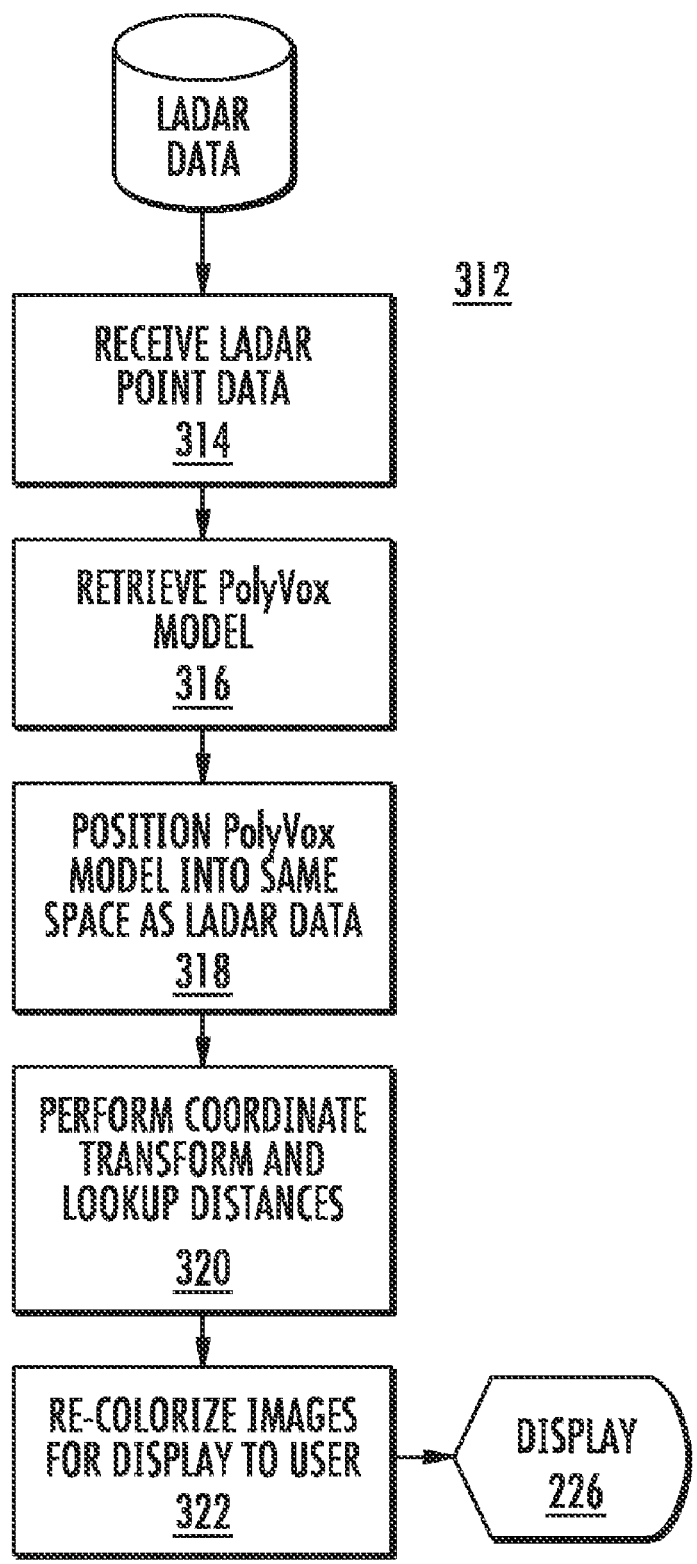

The Analysis Tool 224 of FIG. 2 loads the PolyVox data into viewer 226 and dynamically colorizes the LADAR point data based on a fast and efficient voxel distance look-up. FIG. 3B illustrates a visualization method 312 that compares the processed LADAR point data received at the analysis tool 224 with the PolyVox model 310. This is a near real time process. In step 314 the process 312 receives the processed LADAR point data from storage area 225. In step 316 the PolyVox file 310 is retrieved from storage area 225. The LADAR data includes real world coordinates. In step 318 the user positions the PolyVox model into the real world coordinate space where the LADAR data is stored. In step 320 a coordinate transformation is performed on the LADAR data so that the distances from each LADAR data voxel to its closest surface voxel can be looked up in a table of distances stored with the PolyVox Model. This transform is the inverse of the transform used to position the PolyVox Model 310 in the real world coordinate space. In step 322 the LADAR point data is colorized using the looked-up distances for display in the display 226. The colorization is used to show the user the differences between the LADAR point data and the PolyVox model.

Figure 4A:
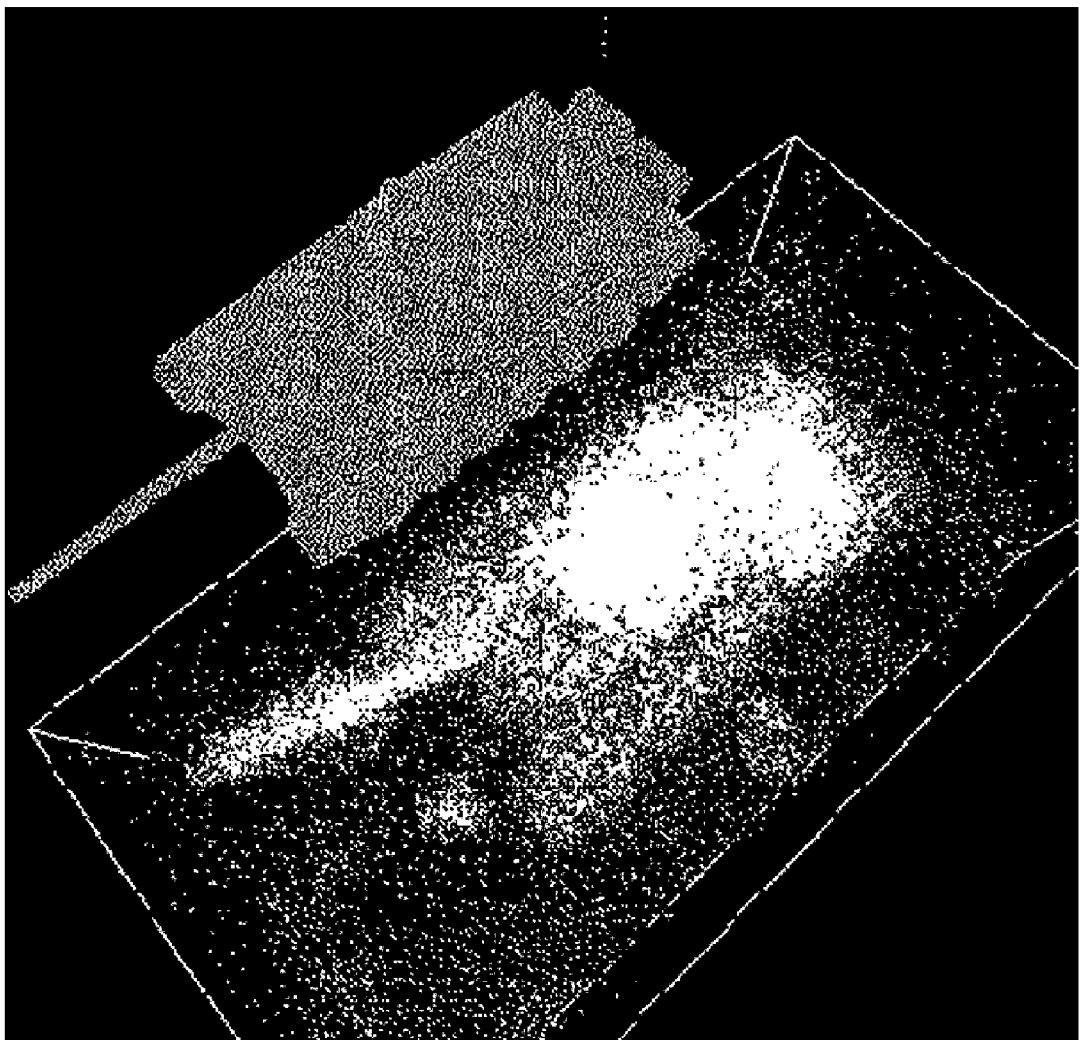
FIG. 4A shows an image of a CAD model of a vehicle along a voxelized model of processed LADAR data corresponding to the vehicle to be identified.

Referring to FIG. 4A, there is shown an image of an unidentified target vehicle rendered from 3-D point data measurements of the vehicle image collected by LADAR instrument 102. The blurry image on the lower right is that produced with the processed LADAR point data received from the aerial part of the process, wherein the points are assigned colors based on their rough distance above ground level (a common technique in the prior art).

Figure 4B:
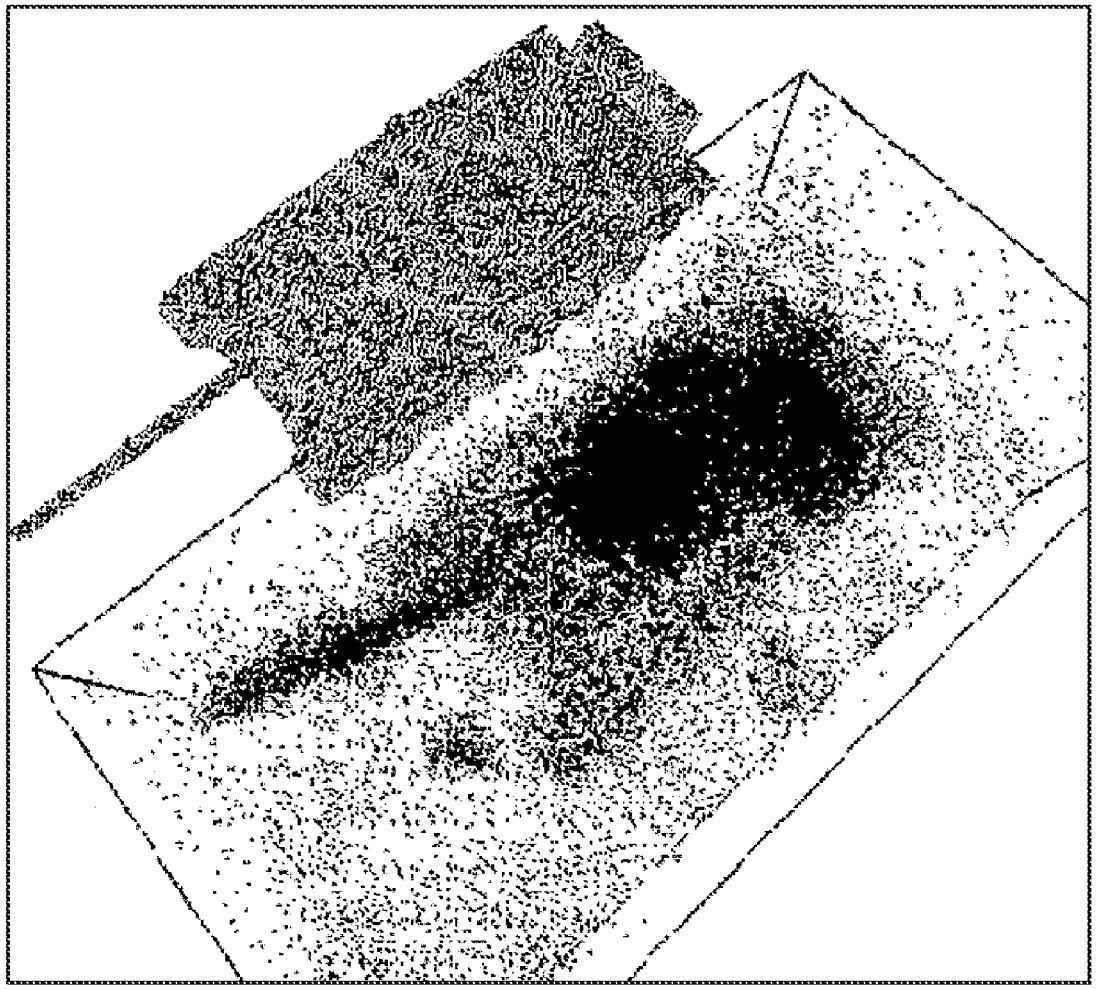
FIG. 4B shows an inverted version of the image of FIG. 4A.

Also shown in FIG. 4A is the detailed polygonal CAD model for the hypothesized identity of the target vehicle, in this case represented by the sharp image of a tank at the upper left of the image. The CAD model is highly detailed and contains actual sizes and spatial relationships of parts comprising the tank. FIG. 4B shows an inverted version of the image of FIG. 4A.

Consider a situation wherein a reconnaissance aircraft reports an object in a given location. The object may be a hostile combat vehicle such as a tank. In response to the report, an unmanned aerial vehicle (UAV) with a LADAR sensor 103 is sent to fly over the target area. The LADAR sensor 103 provides raw data that is processed in the air as discussed above. The result is a cloud of points (the processed LADAR data) that when presented in an interactive 3-D visualization tool 224 may not be sufficient to allow a human user to confidently recognize the target. According to an aspect of the invention, the LADAR data can be automatically processed in near real-time utilizing the PolyVox format of a hypothesized candidate target model to provide an image that enables the human user to more readily verify the identity of the target.

In this case the preliminary analysis reveals that the target is likely to be a particular tank. Therefore, the CAD model shown in FIG. 4A is retrieved. Now the images can be compared to determine the degree of similarity between these two sets of data. The objective is to provide an image that can readily convey the similarities and differences between the hypothesized model and the LADAR point data to a human user. This can be done by colorizing the LADAR data to be displayed according to the distance between the point data and the set of facets comprising the polygonal CAD model. However, given the amount of data to be processed the task is computationally intensive.

We solve this problem by doing as much processing offline ahead of time so that a run-time solution can be provided. Thus, we pre-compute the distances and other data from the CAD model that may be required for real-time processing.

Using a process such as the one illustrated in FIG. 3, we define a voxel space with the tank 106 in the center then we do exhaustive calculations offline. The resulting voxel distance data is stored in the same file as the processed polygonal CAD model data so that both can be used simultaneously. This file comprises a format we call a PolyVox format. This represents a merger of polygon-based and voxelized versions of CAD models. The results of processing the hybrid file include an improved ability for a user to assess the LADAR data quality and the LADAR frame registration. Now online real-time distance lookup enables efficient interactive exploitation of the LADAR data processing system discussed above.

Figure 5A:
FIGS. 5A-D show images illustrating how a colorization is made based on the differences of CAD models of a vehicle from the voxelized model of processed LADAR data corresponding to the vehicle.
Figure 5B:
Figure 5C:
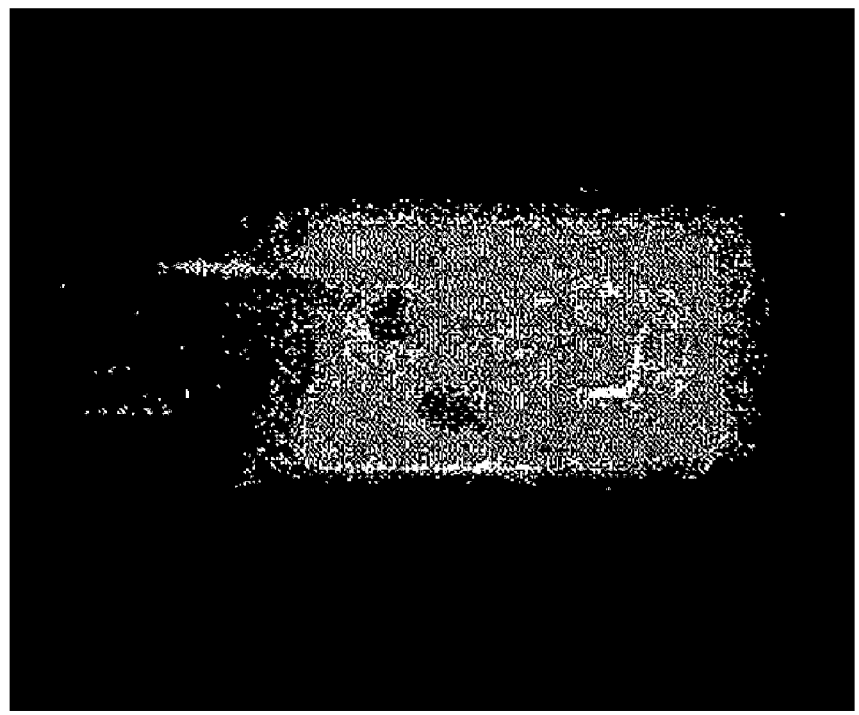
Figure 5D:
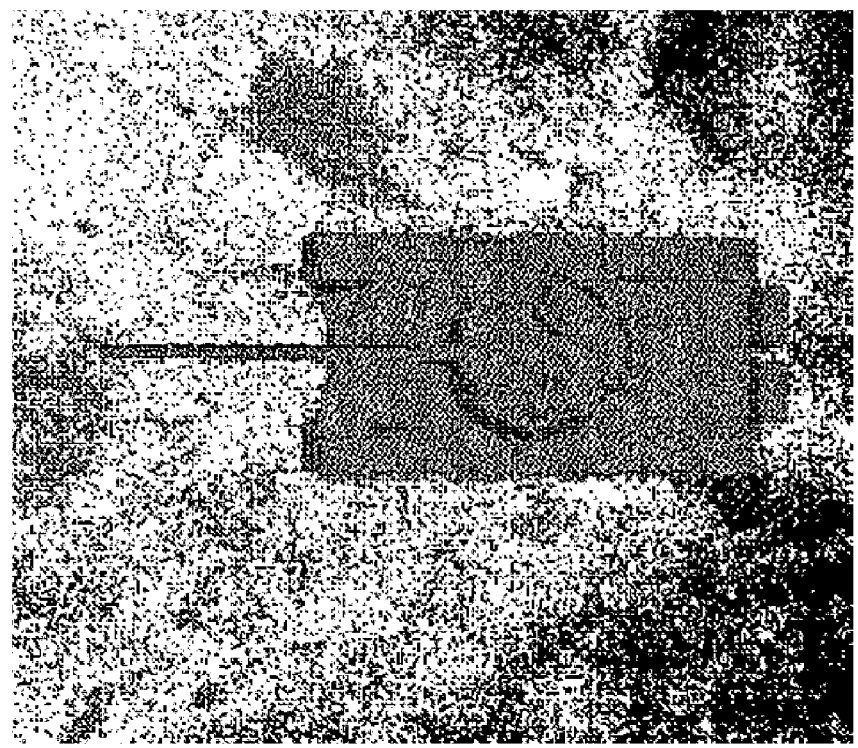

FIGS. 5A-D show images illustrating how a more useful colorization is made based on the differences between LADAR data of a target vehicle and the PolyVox model corresponding to the hypothesized tank. FIG. 5A shows a colorization of the LADAR point data based on height above ground level. FIG. 5B shows the polygonal CAD model interactively aligned by the user with the sensed LADAR 3-D point data using Analysis Tool 224. FIG. 5C shows the Analysis Tool's colorization of the sensed LADAR 3-D point based on distance from the CAD model, which is positioned as indicated in FIG. 5D. Grey points are very near to the CAD model surfaces, while dark or light points are further away and indicate inconsistencies. Note that the turret is rotated, the gun barrel raised, and two people are on top of the tank in the sensed LADAR data. These differences with respect to the polygonal model positioned as in FIG. 5D are discernable to the human user. Note the light colored (backwards) "L" shape due to the box mounted on the turret being in a slightly different location because the turret is rotated. Also note the dark and light colored bands near the right fender of the tank due to the barrel being raised and rotated towards the right. In addition, there are two dark colored bumps on top of the body of the tank next to the turret that are due to personnel standing on the tank, which are objects not captured by the target model. Being able to see that the bulk of the model is grey and therefore consistent with the LADAR data, enables the operator to verify that the vehicle is indeed the hypothesized tank. The operator may further interactively manipulate the PolyVox model to better align the rotated and raised parts to the LADAR data, and the resulting imagery is able to be efficiently updated in real time to show consistency.

The system discussed above is preferably an information processing system such as a microprocessor powered computer. The method can be implemented as a software product executed by a programmable general purpose computer apparatus, as the one discussed above, or as a set of machine executable instructions embedded in a semiconductor memory, or as a special-purpose processing device or application-specific integrated circuit (ASIC).

Therefore, while there has been described what is presently considered to be the preferred embodiment, it is understood by those skilled in the art that other modifications can be made within the spirit of the invention.

We claim:

1. A method for generating a visual display based upon point data of a ground based target, the method comprising:
storing in a memory a plurality of known object design models in a form of respective three-dimensional voxel arrays;
selecting and positioning, using a processor coupled to the memory, a known object design model onto the point data of the ground based target based upon distances between the point data of the ground based target and the corresponding three-dimensional voxel array for the known object design model;
auto cropping the point data of the ground based target based upon a ground based vertical threshold; and
generating, using the processor, the visual display representative of the distances between the point data of the ground based target and the corresponding three-dimensional voxel array for the known object design model.

2. The method of claim 1 wherein generating the visual display comprises using colorization to display distances between the point data of the ground based target and the corresponding three-dimensional voxel array for the known object design model.

3. The method of claim 1 wherein storing the plurality of known object design models comprises selecting a number and a size of voxels based on a resolution of the point data of the ground based target.

4. The method of claim 1, further comprising receiving, using the processor, the point data of the ground based target representing a space where an unknown object is located.

5. The method of claim 1, further comprising recalling from the memory the stored plurality of known object design models for near real-time processing of the point data of the ground based target representing a space wherein an unknown object is located.

6. The method of claim 1, further comprising collecting, using the processor, the point data of the ground based target.

7. The method of claim 1 wherein selecting and positioning the known object design model comprises positioning the known object design model into a coordinate space of the point data of the ground based target.

8. The method of claim 1 wherein generating the visual display is preceded by loading the known object design model into a viewer.

9. A method for generating a visual display comprising:
collecting, using a processor, point data of a target;
auto cropping, using the processor, the point data of the ground based target based upon a ground based vertical threshold;
storing on a memory coupled to the processor a plurality of known object design models in a form of respective three-dimensional voxel arrays;
selecting and positioning, using the processor, a known object design model onto the point data of the ground based target based upon distances between the point data of the ground based target and the corresponding three-dimensional voxel array for the known object design model; and
generating, using the processor, the visual display using a colorized representation of the distances between the point data of the ground based target and the corresponding three-dimensional voxel array for the known object design model.

10. The method of claim 9 wherein the point data of the ground based target represents a space where an unknown object is located.

11. The method of claim 9, further comprising recalling, using the processor, the stored plurality of known object design models for near real-time processing of the point data of the ground based target representing a space wherein an unknown object is located.

12. The method of claim 9 wherein selecting and positioning the known object design model comprises positioning the known object design model into a coordinate space of the point data of the ground based target.

13. An apparatus comprising:
a memory for storing a plurality of known object design models in a form of respective three-dimensional voxel arrays;
a display; and
a processor coupled to said memory and said display for selecting and positioning a known object design model onto point data of a ground based target based upon distances between the point data of the ground based target and the corresponding three-dimensional voxel array for the known object design model;

auto cropping the point data of the ground based target based upon a ground based vertical threshold, and generating a visual display representative of the distances between the point data of the ground based target and the corresponding three-dimensional vowel array for the known object design model.

14. The apparatus of claim 13, wherein said processor generates the visual display using colorization to display distances between the point data of the ground based target and the corresponding three-dimensional vowel array for the known object design model.

15. The apparatus of claim 13 wherein the point data of the ground based target represents a space where an unknown object is located.

* * * * *